July 17, 1951     E. J. PARETO     2,560,658
PROCESS AND PROJECTION MEANS FOR
OBTAINING STEREOSCOPIC DRAWINGS
Filed June 11, 1946     3 Sheets-Sheet 1
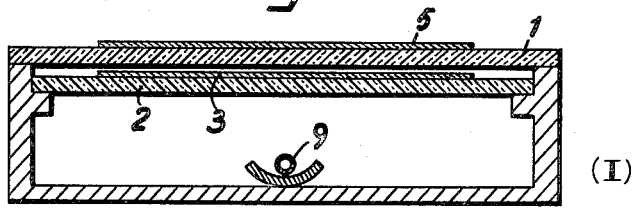
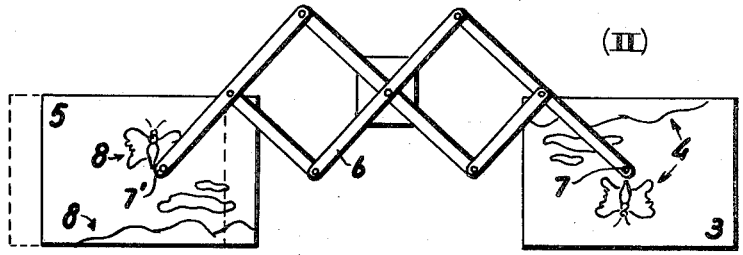
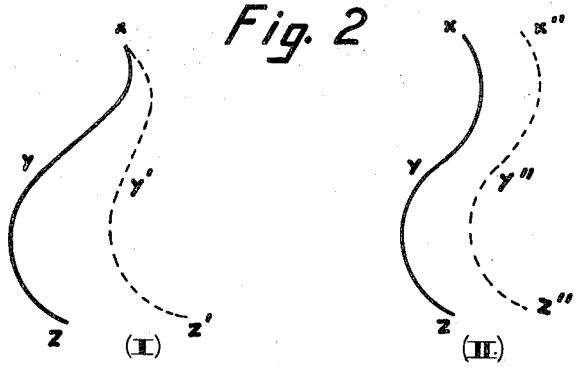
INVENTOR:
EUGENIO JORDANA PARETO
BY
Richardson, David and Nordon
ATTYS July 17, 1951  E. J. PARETO  2,560,658
PROCESS AND PROJECTION MEANS FOR
OBTAINING STEREOSCOPIC DRAWINGS
Filed June 11, 1946  3 Sheets-Sheet 2
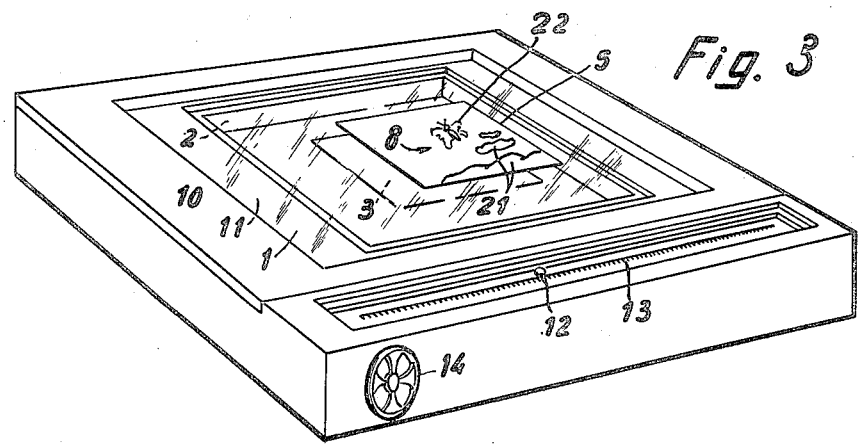
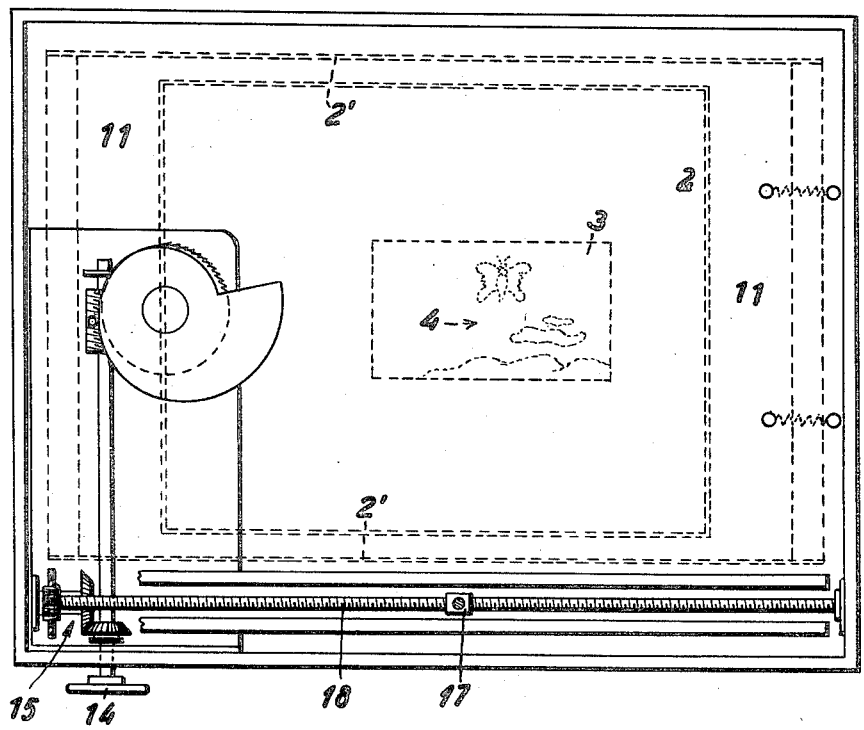
INVENTOR:
EUGENIO JORDANA PARETO
BY
Richardson, David and Nordon
ATTYS Patented July 17, 1951

2,560,658

UNITED STATES PATENT OFFICE 2,560,658

PROCESS AND PROJECTION MEANS FOR OBTAINING STEREOSCOPIC DRAWINGS

Eugenio Jordana Pareto, Barcelona, Spain

Application June 11, 1946, Serial No. 676,082
In Spain November 17, 1945

5 Claims. (Cl. 88—24)

This invention relates to a process for obtaining stereoscopic drawings.

The object of the present specification is to describe and claim improvements in stereometrography, which invention has for its object a method of producing stereoscopic drawings at the discretion of the artist based on the application of the formula which permits of determining the apparent distance from any point of stereoscopic vision as a function of the parallax.

This function finds expression in a system of superimposed translucid plates, one of which is displaceable with respect to the other, the displacements being a function of the depth which it is desired to impart to the drawing in relief with a view to rendering it stereoscopically visible.

With this process drawings are produced either wholly or in part according to the imagination of the artist and which, when observed stereoscopically, produce an exact sensation of reality by reason of their perspective, appreciation of distances, differences of depth and perfect vision of relief and volume of the objects drawn, that is to say in the same way as views taken photographically with verascopic apparatus.

The process according to the invention possesses the special feature of being applicable in such a manner that with the aid of any drawing that requisite complementary drawing for stereoscopic observation can be produced in perfect relief when reproduced in the size adaptable to the stereoscope.

The application of the stereoscopic parallax in photography is already known and has given rise to the science known as photogrammetry utilised in the automatic production of topographical plans by means of apparatus known as stereo autographs. The said application, as has been indicated, is based on the existence of stereoscopic photographs which are analysed by the apparatus referred to above.

The application of the stereoscopic parallax in accordance with the process of the invention, on the other hand, differs completely from that used in photogrammetry, since its purpose is an entirely different one, that is to say the obtaining of completely imaginary stereoscopic drawings.

The formula which permits of determining the apparent distance from any point of stereoscopic vision as a functionof the parallax likewise gives the magnitude of the distance between the centres of the eyes, the distance from the eyes to the stereoscopic photograph and the parallax of the point observed.

The process is based on the formula which relates the apparent distance from any point of stereoscopic vision to the distance between the centres of the eyes, the distance from the same to the stereoscopic drawings containing plane, and the parallax necessary to obtain the desired apparent distance.

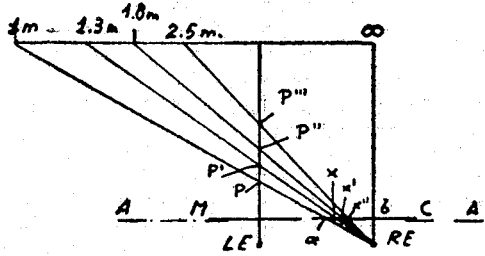

This formula, in accordance with the sketch 5, is:

$$\frac{\overline{P\ LE}}{\overline{RE\ LE}} = \frac{\overline{RE\ b}}{\overline{a\ b}} \qquad (I)$$

in which there are two constant magnitudes which are $\overline{RE\ LE}$—which we will name E, representative of the distance existing between the centres of the eyes, the left LE and the right RE, and $\overline{RE\ b}$ which we will name S, corresponding to the fixed distance, determined by the stereoscope between the eyes and the plane AA which contains the stereoscopic photographs. Both the other magnitudes are variable and signify: $\overline{P\ LE}$ which we will name D, being equal to the apparent distance at which the point P is viewed in the stereoscope; $\overline{ab}$ which we will name P, being representative of the parallax of point P in the complementary drawing.

Consequently, by substitution of these values, the Formula I changes into the following one:

$$\frac{D}{E} = \frac{S}{P} \qquad (II)$$

by means of which when a determined value is given to one of the variable ones it will be possible to obtain the value corresponding to the other.

In the case we are dealing with, we want point P to be stereoscopically viewed at a determined distance, being consequently fixed the variable D which enables us to write the Formula II in the following manner:

$$P = \frac{E \cdot S}{D} \qquad (III)$$

and since E has an average value of 0.065 metre and S is established with 0.1 metre, the Formula III changes into:

$$P=\frac{0.065 \cdot 0.1}{D}=\frac{0.0065}{D}$$

which gives us the parallaxes P, corresponding to the apparent distances D at which we wish to view stereoscopically the point P.

With this formula may be established tables giving directly, for greater easiness, the parallax corresponding to every apparent distance and, by means of the said tables, may be prepared a complementary drawing of another principal one, which by stereoscopic vision of the combination of both, will procure us the sensation of viewing each of its details at the depth or apparent distance which is desired.

As therefore each depth has its corresponding parallax, the invention consists in obtaining the said depths, by the transversal displacement of the glass on which rests the paper, in direction parallel to the plane of the same on which the paper rests, relatively to the glass on which the drawing appears, the drawing being caused moreover to be projected on to the paper by illumination arranged underneath it.

As a modified embodiment, the paper and the drawing may be in an inverse position from that explained above, the latter being projected on to the former by suitable means or by providing collateral plates, one fixed and the other movable or in any other manner performing a like function.

In the device according to the process indicated above, the displacement of the paper on the drawing may attain a maximum magnitude corresponding to that of a maximum depth, that is to say 1,000 metres or infinity, and the downward limit of which will provide decreasing depths down to zero.

The process therefore consists in arranging a master drawing on a transparent glass and in placing on another glass whether matt or otherwise, a paper, the former or the latter being arranged in a suitable sliding frame.

In like manner transparent paper may be used instead of the top glass, in which case the drawing will be rendered visible through transparency.

The illumination is effected from beneath the movable glass carrying the master drawing.

When the apparatus is lighted up the master drawing will be projected in actual size on the upper paper, whereupon it will merely be necessary to effect the displacement in order to achieve the stereoscopic effect.

This displacement is effected by means of a suitable mechanism hereinafter described by way of example, with the aid of which and with the graduation representing depths, the projected image is caused to be displaced, the said displacement being followed by the pencil.

In order to facilitate the explanation thereof, a number of drawings are attached hereto showing one embodiment by way of example.

In the drawing:

Fig. 1 shows schematically in cross section a fundamental diagram (I) of the embodiment of the invention; (II) indicates a modification of the system with two collateral glasses utilizing a pantograph.

Fig. 2 shows, at (I) an embodiment of the drawing in which one of its points is removed and with it the remainder of the line, (II) being a variation in which the whole of the line is removed and located in a parallel plane.

Fig. 3 shows the device in perspective; and

Fig. 4 is a plan view of the device with the upper glass withdrawn to show the actuating mechanisms of the displaceable glass;

Figure 5:
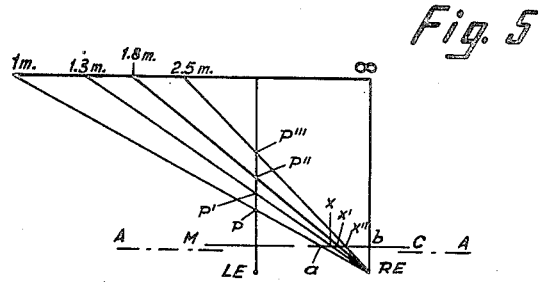
Fig. 5 is a diagram serving as a basis for the calculation of the parallaxes.

The invention consists in arranging on two parallel or collateral glasses (Figs. 1, I and II) respectively, the paper of the master drawing 4 and the transparent paper 5 to be drawn on, respectively. When the system described under case II of Fig. 1 is employed, it is not absolutely necessary to illuminate the drawings by transparency, as in that case a pantograph 6 is used, one point 7 of which runs over the master drawing 4, while the other point 7', which is provided with a conventional tracing device, is tracing the complementary drawing 8.

The drawing is illuminated from the source of light 9, located beneath the same or any other arrangement.

The glass 2 is displaceable laterally and in a parallel plane with respect to 1.

If we take a curve (Fig. 2) indicated by the line $xyz$, and desire to produce a duplicate thereof in order to achieve a stereoscopic effect of distance from the point $z$, the pencil is fixed on the point $x$ and the glass 2 is gently displaced with respect to 1, towards one side or the other according as it is desired to approach or move away from the original line. Assuming the latter to be the case, the point $z$ will be displaced towards the right. If this displacement is uniform, we shall obtain, according to the projection of the line on the paper a new line $xy'z'$ which on being observed together with the original line in the stereoscope, will indicate that the plane in which is drawn the line $xyz$ is inclined towards the rear whilst maintaining the same point $x$ (Fig. 2, I).

If the displacement is effected in accordance with different depths, that is to say non-uniformly, then the parts of the new line on being combined with the drawing for stereoscopic vision, will give us the impression that it is transversely undulating in depth.

If, instead of maintaining the pencil at the point $x$, we displace the whole projection over a certain distance corresponding to a certain depth, the new line drawn $x''y''z''$ (Fig. 2, II) will indicate in the stereoscope that the line is in a rearward or remote plane.

The device for carrying this work into effect permits of automatically effecting the displacement without the necessity for following the tables any more than is needed for the preparation and the guidance of the artist.

Figure 8:
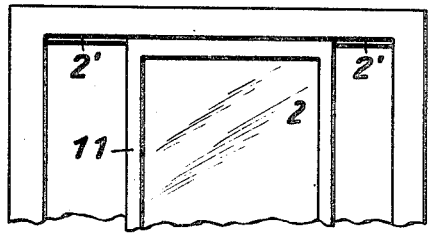
Fig. 8 is a partial plan view of the device indicating the arrangement of the displaceable glass.

The device in question or the stereometrograph is shown in Fig. 3; it consists of an upper frame 10 for holding the paper to be drawn on, the latter being placed for that purpose below the periphery of the frame, which is adapted to be raised. A lower frame 11, parallel to the first, serves for holding the master drawing; this frame is adapted to slide lengthwise of a number of guides 2' (Fig. 8) in lateral motion in a plane parallel to that of the glass 1, the limit of which motion is the width of the upper frame.

The movement of the frame 11 is related to the movement of translation of a pointer 12, which travels from one end of the graduated scale 13 to the other.

The movements are effected by means of the hand wheel 14.

To ensure perfect transparent vision, the frame 2 contains a matt glass of the size of the master drawing and which is illuminated from inside the case containing the mechanism of the apparatus.

The mechanism consists of a gear or other transmission system 15 which simultaneously operates the displacement of the frame 11 and of the indicator 21.

The frame 11 receives the thrust of the cam 16, calculated relatively to the scale of depths in the table.

The pointer 12 is mounted by means of a nut 17' on the spindle 18 on which it is displaceable in either direction.

The method is carried out with this apparatus as follows:

Having placed the master drawing in the frame 11, and illuminated it from the inside, the tracing is effected normally with the right hand whilst with the left hand the necessary displacement is effected actuating upon the hand wheel 14 so that each image is observed stereoscopically to the desired depth which is indicated by the pointer 12.

The method of reproduction may vary considerably; thus, for instance, when the frames are collateral and one slides with respect to the other, a pantograph 6, with following point 7 and tracing point 7' (Fig. 1, II) or a similar copying device, without utilising the above described projection system, or the master drawing can be projected on a screen, and the said screen (Fig. 6) or the projection displaced according to the depth which it is desired to obtain, thus producing a new complementary drawing 8.

Figure 6:
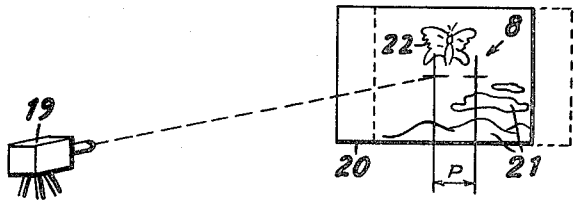
Fig. 6 illustrates a variant of the process utilizing a projector in combination with a laterally displaceable screen.

With respect to Fig. 6, when the system of projection is used to obtain the complementary drawings, one proceeds by starting from master drawings on basis of transparencies. The main drawing prepared in the form of a transparency is projected by means of projector 19 on to the screen 20, which consists of a sheet of suitable material and size for designing the contour and details of the projected drawing.

The projected image is an enlargement of the principal drawing in all its details. If it is followed by means of any tracing device, an enlarged reproduction of the principal drawing is obtained.

Now, if we design instead of counter-drawing all the elements of the drawing which is projected, for instance the clouds—and mountains 21, these will remain in the same position on the plane of the projected drawing as the one which they occupy in the principal drawing.

The complementary drawing—which is the one that is projected, photographed and reduced to the same size as the principal one—when being placed together with the latter in an apparatus for stereoscopic vision, will produce the sensation that the mountains and the clouds 21 are in the infinite, for the reason that the vision lines from a person's eye viewing its corresponding drawing are parallel, since they have the same position within the plane of each drawing.

But if in the projected drawing—once the elements 21 have been reproduced such as to be situated at the infinite—are displaced laterally, the screen or plane of the projected drawing in relation to the projector, and if we design the projected new image, for instance the butterfly 22, we shall obtain—once photographed and reduced—a complementary drawing which, when being viewed in a stereoscope, will give the sensation above indicated for the elements 21, but when viewing the butterfly 22 as its situation within the complementary drawing had varied in relation with the one it occupies in the principal drawing, the visual line of the eye looking at the complementary drawing will be obliged to deviate from the parallelism which is sustatined with the one of the other eye, which consequently produces the sensation that the butterfly 22 is at a distance different from the infinite, in the present case nearer, since the sensation of the infinite is produced solely when the visual lines of both the eyes are parallel.

It is clearly seen that by varying the transversal relative displacements between screen and projector may be obtained the principal elements of the principal drawing reproduced on the complementary one in the manner that when they are viewed both in the stereoscope, they produce the sensation of being at different distances, which distances will be the same whatsoever may be the process employed for the reproduction, if for each element of the drawing are conserved the same relative or multiple displacements of those in the cases in which there may be enlargement.

Figure 7:
Fig. 7 is an example of the master drawing in relation to the complementary drawings, showing the distinct elements thereof.

The complementary images of the principal drawing may be seen in dotted lines on Fig. 7, in which the consecutive lines represent the principal images. Said complementary images are identical with the principal ones, but laterally displaced with respect to the same, variable magnitudes each of which being in accordance with the depth at which we may want the object to appear when the drawings are viewed in the stereoscope.

The invention may in its essential features be carried into effect in a number of ways which are likewise within the scope of the protection claimed. It may, moreover, be constructed in any form and size, utilising for its manufacture the most suitable elements and mechanisms, for producing stereoscopic effects from an original drawing, stereoscopic effects in cinematograph films, animated cartoons, scientific and other explanations, the whole being covered by the claims.

Having now fully described my invention, what I claim as new and desire to secure by Letters Patent is:

1. A process for making sets of translucent stereoscopic drawings for viewing and comprising the steps of mounting a transparent sheet containing a master drawing in an apparatus such that it is laterally movable parallel to and adjacent a similar sheet on which a complementary drawing is to be made, associating with the mounting means of the master drawing sheet a pointer moving over a scale means, calibrated to indicate stereoscopic displacements corresponding to varying distances of points on the master drawing from the eye of the viewer, indicating on the sheet carrying the complementary drawing the position of the points on the master drawing indicated by the pointer after moving the master drawing in accordance with the scale means, and making the complementary drawings of the master drawing at the points indicated by the pointer.

2. Device for carrying out the method according to claim 1, comprising two frames arranged in a superimposed position and movable in planes parallel to each other and to the scale and pointer means, the lower frame holding a glass plate illuminated from beneath and the master drawing, and the upper one the paper for the complementary drawing, the pointer being fixed to the lower frame and displaceable along the scale having indicated thereon different stereoscopic displacements.

3. A device according to claim 2, in which the master drawing is fixed to a glass plate laterally displaceable on guides.

4. A device according to claim 3 in which the master drawing is illuminated so that it is projected on to the paper for the complementary drawing.

5. A device according to claim 4 in which the position of the master drawing and complementary image are in the same plane.

EUGENIO JORDANA PARETO.

REFERENCES CITED

The following references are of record in the file of this patent:

UNITED STATES PATENTS

| Number | Name | Date |
| --- | --- | --- |
| 669,549 | Roche | Mar. 12, 1901 |
| 870,506 | Gillet | Nov. 5, 1907 |
| 1,022,270 | Sciamengo | Apr. 2, 1912 |
| 1,559,316 | Diernhofer | Oct. 27, 1925 |
| 1,635,795 | Linnebach | July 12, 1927 |
| 1,693,527 | Reeves | Nov. 27, 1928 |
| 1,894,148 | Barr | Jan. 10, 1933 |
| 2,057,051 | Owens | Oct. 13, 1936 |
| 2,074,088 | Kurtz | Mar. 16, 1937 |
| 2,194,682 | Abrams | Mar. 26, 1940 |
| 2,196,905 | Sherman | Apr. 9, 1940 |
| 2,210,333 | Kroner | Aug. 6, 1940 |
| 2,307,981 | Babcock et al. | Jan. 12, 1943 |
| 2,368,925 | Herdeck | Feb. 6, 1945 |
| 2,387,555 | Bauersfeld | Oct. 23, 1945 |